United States Patent
Johnson et al.

(10) Patent No.: US 11,631,877 B2
(45) Date of Patent: Apr. 18, 2023

(54) METHOD OF BONDING ACID-DOPED MEMBRANES AND A BONDED POLYBENZIMIDAZOLE MEMBRANE STRUCTURE

(71) Applicant: JTEC Energy, Inc., Atlanta, GA (US)

(72) Inventors: Lonnie G. Johnson, Atlanta, GA (US); Andrew Ashford Knight, Norcross, GA (US); Tedric D. Campbell, Lithia Springs, GA (US); Malcolm Moses Johnson, East Point, GA (US)

(73) Assignee: JTEC ENERGY, INC., Atlanta, GA (US)

( * ) Notice: Subject to any disclaimer, the term of this patent is extended or adjusted under 35 U.S.C. 154(b) by 368 days.

(21) Appl. No.: 16/976,001

(22) PCT Filed: Feb. 28, 2019

(86) PCT No.: PCT/US2019/019935
§ 371 (c)(1),
(2) Date: Aug. 26, 2020

(87) PCT Pub. No.: WO2019/169064
PCT Pub. Date: Sep. 6, 2019

(65) Prior Publication Data
US 2021/0043955 A1   Feb. 11, 2021

Related U.S. Application Data

(60) Provisional application No. 62/636,384, filed on Feb. 28, 2018.

(51) Int. Cl.
*H01M 8/103* (2016.01)
*H01M 8/1048* (2016.01)
(Continued)

(52) U.S. Cl.
CPC ......... *H01M 8/103* (2013.01); *H01M 8/1048* (2013.01); *H01M 8/1093* (2013.01); *H01M 2008/1095* (2013.01)

(58) Field of Classification Search
CPC ... H01M 8/103; H01M 8/1048; H01M 8/1093
(Continued)

(56) References Cited

U.S. PATENT DOCUMENTS

| | | |
|---|---|---|
| 2005/0181254 A1 | 8/2005 | Uensal et al. |
| 2006/0286425 A1 | 12/2006 | Nakato et al. |

(Continued)

FOREIGN PATENT DOCUMENTS

| | | |
|---|---|---|
| CN | 105601968 A | 5/2016 |
| JP | 2000038472 A | 2/2000 |

(Continued)

OTHER PUBLICATIONS

Nakajima et al., "On the Thermally Stable Polymers as Industrial Material—Polybenz Imidazole-," Japan, Institute of Industrial Science, The University of Tokyo, Part 4, vol. 21, No. 9, pp. 12-17 (Sep. 1969); URL:https://repository.dl.itc.u-tokyo.ac.jp/record/22041/files/sk021009003.pdf.

(Continued)

*Primary Examiner* — James M Erwin
(74) *Attorney, Agent, or Firm* — Panitch Schwarze Belisario & Nadel LLP

(57) ABSTRACT

A method for bonding together two or more acid-doped polybenzimidazole films is provided. The method includes, in the following order: placing a first acid-doped polybenzimidazole film on a first substrate to form a first film/substrate assembly and placing a second acid-doped polybenzimidazole film on a second substrate to form a second film/substrate assembly; heating the first and second film/substrate assemblies to a temperature sufficient to soften the (Continued)

first and second acid-doped polybenzimidazole films; positioning the second film/substrate assembly atop the first film/substrate assembly, such that polybenzimidazole polymer chains of the first acid-doped polybenzimidazole film interact with polybenzimidazole polymer chains of the second acid-doped polybenzimidazole film; and re-hydrolyzing the first and second acid-doped polybenzimidazole films, such that the polybenzimidazole polymer chains of the first and second acid-doped polybenzimidazole films are therefore reformed and interlocked with each other to bond together the first and second acid-doped polybenzimidazole films.

15 Claims, 2 Drawing Sheets

(51) Int. Cl.
 *H01M 8/1086* (2016.01)
 *H01M 8/10* (2016.01)
(58) Field of Classification Search
 USPC .......................................................... 156/305
 See application file for complete search history.

(56) References Cited

U.S. PATENT DOCUMENTS

| | | |
|---|---|---|
| 2012/0052403 A1 | 3/2012 | Tatematsu |
| 2012/0141910 A1 | 6/2012 | Jia et al. |
| 2016/0340484 A1* | 11/2016 | Kharul ................ H01M 8/1039 |
| 2017/0114196 A1* | 4/2017 | Häring ................ H01M 50/489 |

FOREIGN PATENT DOCUMENTS

| | | |
|---|---|---|
| JP | 2005527948 A | 9/2005 |
| JP | 2006032276 A | 2/2006 |
| JP | 2006324140 A | 11/2006 |
| JP | 2008153174 A | 7/2008 |
| JP | 2010245019 A | 10/2010 |
| JP | 2011165347 A | 8/2011 |
| JP | 2012054066 A | 3/2012 |
| KR | 20170106790 A | 9/2017 |
| WO | 2014087958 A1 | 6/2014 |

OTHER PUBLICATIONS

Office Action dated Nov. 15, 2021 in JP Application No. 2020545131.
Office Action dated Jun. 20, 2022 in JP Application No. 2020545131.
International Preliminary Report on Patentability dated Sep. 10, 2020 in International Application No. PCT/US2019/019935.
International Search Report and Written Opinion dated May 14, 2019 in International Application No. PCT/US2019/019935.
Office Action dated Dec. 16, 2022 in CN Application No. 2019800148902 with English Translation.

* cited by examiner

METHOD OF BONDING ACID-DOPED MEMBRANES AND A BONDED POLYBENZIMIDAZOLE MEMBRANE STRUCTURE

CROSS-REFERENCE TO RELATED APPLICATION

This application is a Section 371 of International Application No. PCT/US2019/019935, filed Feb. 28, 2019, which was published in the English language on Sep. 6, 2019, under International Publication No. WO 2019/169064 A1, which claims priority to U.S. Provisional Patent Application No. 62/636,384, filed Feb. 28, 2018, the disclosures of which are incorporated herein by reference in their entireties.

BACKGROUND OF THE INVENTION

The conversion of heat energy or chemical energy to electrical energy, or visa-versa, may be accomplished in a variety of ways. For example, known electrochemical cells or batteries rely on chemical reactions, wherein ions and electrons of a reactant which is being oxidized are transferred to the reactant which is being reduced via separate paths. Specifically, the electrons are transferred electrically via wiring through an external load where they perform work, while the ions are conducted through an electrolyte separator.

However, battery-type electrochemical cells can produce only a limited amount of energy, because the confines of the battery casing limit the amount of available reactants that may be contained therein. Although such electrochemical cells can be designed to be recharged by applying a reverse polarity current/voltage across the electrodes, such recharging requires a separate electrical source. Also, during the recharging process, the electrochemical cell is typically not usable.

Fuel cells have been developed in an effort to overcome problems associated with battery-type electrochemical cells. In conventional fuel cells, the chemical reactants are continuously supplied to and removed from the electrochemical cell. In a manner similar to batteries, fuel cells operate by conducting an ionized species through a selective electrolyte within a membrane electrode assembly (MEA) which generally blocks the passage of electrons and non-ionized species.

The most common type of fuel cell is a hydrogen-oxygen fuel cell which passes hydrogen through one of the electrodes and passes oxygen through the other one of the electrodes. Porous electrodes on either side of the electrolyte separator membrane are used to couple the electrons involved in the chemical reaction to an external load via an external circuit. The hydrogen ions are conducted through the electrolyte separator to the oxygen side of the cell under the chemical reaction potential of hydrogen and oxygen. On the oxygen side, the electrons and hydrogen ions reconstitute hydrogen and complete the reaction with oxygen, resulting in the production of water which is expelled from the system. A continuous electrical current as hydrogen and oxygen are continuously supplied to the cell.

Mechanical heat engines have also been designed and used to produce electrical power. Such mechanical heat engines operate on thermodynamic cycles, wherein shaft work is performed using a piston or turbine to compress a working fluid. The compression process is performed at a low temperature and, after compression, the working fluid is raised to a higher temperature. At the high temperature, the working fluid is allowed to expand against a load, such as a piston or turbine, thereby producing shaft work. A key to the operation of all engines employing a working fluid is that less work is required to compress the working fluid at low temperatures than that produced by expanding it at high temperatures. This is the case for all thermodynamic engines employing a working fluid.

For example, steam engines operate on the Rankine thermodynamic cycle, wherein water is pumped to a high pressure, and then heated to steam and expanded through a piston or turbine to perform work. Internal combustion engines operate on the Otto cycle, wherein low temperature ambient air is compressed by a piston and then heated to very high temperatures via fuel combustion inside the cylinder. As the cycle continues, the expansion of the heated air against the piston produces more work than that consumed during the lower temperature compression process.

The Stirling engine has been developed to operate on the Stirling cycle in an effort to provide an engine that has high efficiency and offers greater versatility in the selection of the heat source. The ideal Stirling thermodynamic cycle is of equivalent efficiency to the ideal Carnot cycle, which defines the theoretical maximum efficiency of an engine operating on heat input at high temperatures and heat rejection at low temperatures. However, as with all mechanical engines, the Stirling engine suffers from reliability problems and efficiency losses associated with its mechanical moving parts.

In an effort to avoid the problems inherent with mechanical heat engines, Alkali Metal Thermo-Electrochemical Conversion (AMTEC) cells have been designed as a thermo-electrochemical heat engine. AMTEC heat engines utilize pressure to generate a voltage potential and electrical current by forcing an ionizable working fluid, such as sodium, through an electrochemical cell (membrane electrode assembly, MEA) at high temperatures. The electrodes couple the electrical current to an external load. Electrical work is performed as the pressure differential across the electrolyte separator forces molten sodium atoms through the electrolyte. The sodium is ionized upon entering the electrolyte, thereby releasing electrons to the external circuit. On the other side of the electrolyte, the sodium ions recombine with the electrons to reconstitute sodium upon leaving the electrolyte, in much the same way as the process that occurs in battery and fuel cell type electrochemical cells. The reconstituted sodium, which is at a low pressure and a high temperature, leaves the electrochemical cell as an expanded gas. The gas is then cooled and condensed back to a liquid state. The resulting low-temperature liquid is then re-pressurized. Operation of an AMTEC engine approximates the Rankine thermodynamic cycle.

Numerous publications are available on AMTEC technology. See, for example, *Conceptual design of AMTEC demonstrative system for* 100 *t/d garbage disposal power generating facility*, Qiuya Ni et al. (Chinese Academy of Sciences, Inst. of Electrical Engineering, Beijing, China). Another representative publication is *Intersociety Energy Conversion Engineering Conference and Exhibit* (IECEC), 35th, Las Vegas, Nev. (Jul. 24-28, 2000), Collection of Technical Papers. Vol. 2 (A00-37701 10-44). Also see American Institute of Aeronautics and Astronautics, 190, p. 1295-1299. REPORT NUMBER(S)—AIAA Paper 2000-3032.

AMTEC heat engines suffer from reliability issues due to the highly corrosive nature of the alkali metal working fluid. AMTEC engines also have very limited utility. Specifically, AMTEC engines can only be operated at very high temperatures because ionic conductive solid electrolytes achieve practical conductivity levels only at high temperatures. Indeed, even the low-temperature pressurization process must occur at a relatively high temperature, because the alkali metal working fluid must remain above its melt temperature at all times as it moves through the cycle. Mechanical pumps and even magneto-hydrodynamic pumps have been used to pressurize the low-temperature working fluid.

In an effort to overcome the above-described drawbacks of conventional mechanical and thermo-electrochemical heat engines, the Johnson Thermo-Electrochemical Converter (JTEC) system, which can approximate a Carnot equivalent cycle (disclosed in U.S. Pat. No. 7,160,639 filed Apr. 28, 2003, the entire contents of which are incorporated herein by reference), was invented. The typical JTEC system is a heat engine that includes a first electrochemical cell (MEA) operating at a one temperature, a second electrochemical cell (MEA) operating at a different temperature from the first, a conduit system including a heat exchanger that couples the two cells together, and a supply of ionizable gas (such as hydrogen or oxygen) as a working fluid contained within the conduit system. Each MEA stack includes a non-porous membrane capable of conducting ions of the working fluid with porous electrodes positioned on opposite sides.

In the JTEC, working fluid passes through each MEA stack by releasing an electron to the electrode on the entering side, such that the ions (protons) can be conducted through the membrane to the opposite electrode. The working fluid is reconstituted within the opposite electrode as it re-supplies electrons to working fluid ions as they exit the membrane, the electrons having passed through an external load or controller. If a hydrogen pressure differential is applied across an MEA having an electrical load attached, it will supply power to the load as hydrogen passes from high pressure to low pressure. The process also operates in reverse. Voltage and current can be applied to an MEA to pump hydrogen from low pressure to high pressure.

Operating under a pressure differential, the high temperature cell will have a higher voltage than the low temperature cell, consistent with the Nernst equation. As in any other engine, the working fluid, hydrogen in this case, is compressed a low temperature and expanded at high temperature to produce net power output. Consistent current through both MEAs maintains a constant pressure differential. Since the current (I) is the same through both cells, the voltage differential means that the power generated through the expansion of hydrogen in the high temperature cell is higher than that of the low temperature cell.

A number of challenges have been encountered with developing a JTEC that is suitable for widespread use, particularly related to the issues associated with using hydrogen as a working fluid. For example, hydrogen leakage through small defects in the conduit system may occur due to the small size of the hydrogen molecule. In particular, hydrogen leakage can occur at the interconnection joints of the conduit couplings between the high-temperature cell and the low temperature cell. Such leakage is undesirable in that it reduces the pressure differential of the working fluid across the membrane and in that so reduces the electrical output and overall system efficiency.

Further, unlike conventional fuel cells, where the open circuit voltage can be greater than one volt, the Nernst voltage from the hydrogen pressure differential across an MEA stack is in the range of only about 0.2 Volts. As such, many cells will have to be connected in series to achieve useful output voltage levels. In addition, each JTEC cell needs to have a large membrane/electrode surface area in order to achieve useful levels of output current and minimum voltage loss due to membrane resistance. That is, considering the low operating voltages of individual cells and the low conductivity of available membrane materials, large membrane surface areas are needed to produce useful levels of power. A direct-bonded membrane structure would alleviate the aforementioned challenges related to hydrogen leakage by eliminating conduit couplings, which are prone to leakage.

As such, membranes, like those used in thermoelectric engines, need to have sufficiently high ion conductivity to maximize output voltage as well as high diffusion barrier properties to minimize pressure-induced diffusion of working fluid, such as hydrogen gas or any gas with an accompanied conductor (e.g., oxygen), across the membrane and the reduction in electrical output and efficiency associated with it. However, available hydrogen ion conductive membrane materials that have useful ion conductivity, such as Nafion, a polymer manufactured by the DuPont Corp., generally have very poor molecular diffusion barrier properties and result in loss of the pressure differential required for operation. Conversely, available membrane materials such as ceramic ion conductors that have high molecular diffusion barrier properties generally have relatively low ionic conductivity, particularly at low to moderate temperatures and use of such materials would result in high system impedance and high polarization losses. Accordingly, there is a need for a practical way of using available high barrier, high ion or proton conductivity materials as thin, large surface area membranes, in order to provide a thermo-electrochemical heat engine that can approximate a Carnot equivalent cycle and that eliminates the reliability and inefficiency problems associated with conventional mechanical engines.

For this reason, interest in the use of solid polymer electrolytes has grown immensely. Unlike conventional alternative membrane materials, such as Nafion® whose conductivity is dependent upon water availability and thus requires external humidification for optimal operation, the proton conductivity of solid polymer electrolytes is not dependent on water availability, and thus they operate at high temperatures without external humidification. For that, one membrane of particular interest for solid polymer electrolytes is based on polybenzimidazole (PBI) polymers. PBI polymers are a group of polymers renowned for their excellent thermal and chemical stability. More particularly, PBI inherently has high thermal and chemical stability due to its aromatic structure and strong and rigid nature of the aromatic structure's bonds Methods have been developed to make PBI solutions from which thin membranes can be cast. Specifically, PBI films can be used as a solid polymer electrolyte by casting the membrane from a solution, and then doping the membrane in phosphoric acid (PA) to make the polymer proton conductive. See, e.g., J. S. Wainright et al., "Acid-doped polybenzimidazoles: a new polymer electrolyte," *Journal of the Electroochemical Society*, 142(7) (1995).

Xiao et al. developed a sol-gel process called the "PPA process" (polyphosphoric acid process), in which PA-doped PBI membranes can be synthesized (see, e.g., L. Xiao et al., "High-temperature polybenzimidazole fuel cell membranes via a sol-gel process," *Chemistry of Materials*, 17(21), 5328-333 (2005)). Acid-doped gel membranes synthesized via the polyphosphoric acid (PPA) process have a high acid content per repeat unit of polymer, which results in high proton conductivity and in the membrane retaining mechanical properties of a degree that enable the polymer to be used in fuel cell applications. Thus, acid-doped PBI membranes would be particularly desirable for use in fuel cell applications. One of the limits of an acid-doped PBI-based membrane, however, is that it does not readily bond to itself as well as other materials. Thus, it becomes difficult to bond together to PBI membranes to form subassemblies used to make an electrochemical cell stack. Therefore, it is desirable to provide a method for efficiently bonding together acid-doped PBI membranes.

BRIEF SUMMARY OF THE INVENTION

In one embodiment, the present invention relates to a method for bonding together two or more acid-doped polybenzimidazole films. The method comprises, in the following order: placing a first acid-doped polybenzimidazole film on a first substrate to form a first film/substrate assembly and placing a second acid-doped polybenzimidazole film on a second substrate to form a second film/substrate assembly; heating the first and second film/substrate assemblies to a temperature sufficient to soften the first and second acid-doped polybenzimidazole films; positioning the second film/substrate assembly atop the first film/substrate assembly, such that the first acid-doped polybenzimidazole film is in contact with the second acid-doped polybenzimidazole film and such that polybenzimidazole polymer chains of the first acid-doped polybenzimidazole film interact with polybenzimidazole polymer chains of the second acid-doped polybenzimidazole film; and re-hydrolyzing the first and second acid-doped polybenzimidazole films, such that the polybenzimidazole polymer chains of the first and second acid-doped polybenzimidazole films are therefore reformed and interlocked with each other to bond together the first and second acid-doped polybenzimidazole films.

DETAILED DESCRIPTION OF THE INVENTION

Figure 1:
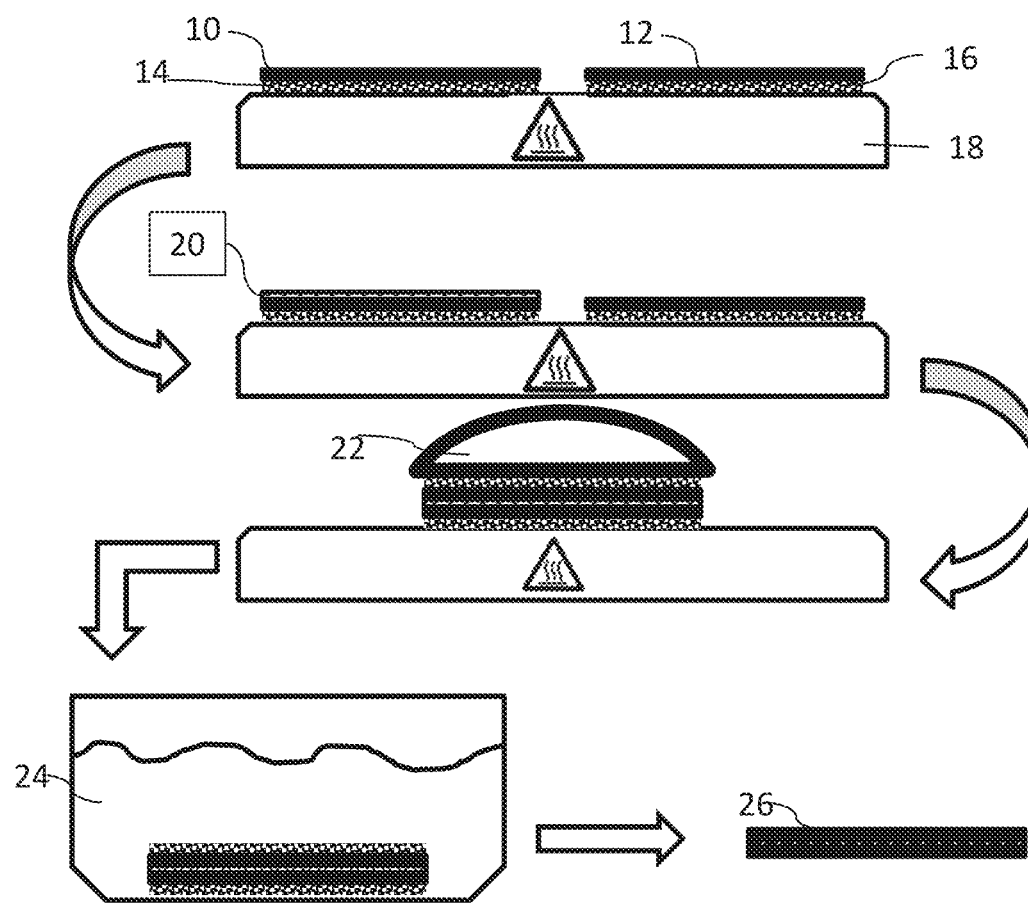
FIG. 1 is a schematic diagram of a method in accordance with an embodiment of the present invention.

Embodiments of the present invention are described herein. The disclosed embodiments are merely exemplary of the invention that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, at least some specific structural and functional details disclosed herein are not to be interpreted as limiting, but merely as a basis for the claims and as a representative basis for teaching one skilled in the art to variously employ the present invention.

Certain terminology is used in the following description for convenience only and is not limiting. The words "proximal," "distal," "upward," "downward," "bottom" and "top" designate directions in the drawings to which reference is made. The words "inwardly" and "outwardly" refer to directions toward and away from, respectively, a geometric center of the assembly, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

It will also be understood that terms such as "first," "second," and the like are provided only for purposes of clarity. The elements or components identified by these terms, and the operations thereof, may easily be switched.

The present invention relates to a method for bonding together two or more acid-doped PBI films or membranes. More particularly, the invention relates to a method for bonding together two or more acid-doped polymer films or membranes which have been fabricated by a sol-gel process, preferably utilizing PPA, and more preferably which have been synthesized via the PPA process. Even more particularly, the invention relates to a method for bonding together two or more PA-doped polymer films or membranes which have been synthesized via the PPA process. The remainder of the discussion of the method relates to a scenario of bonding together two such films or membranes, but it will be understood that the method may simply be repeated or duplicated as necessary to bond together additional films or membranes. Also, the remainder of the discussion herein primarily refers to a polymer membrane, but it will be understood that the method is fully applicable to any polymer film.

In the PPA process, PPA is utilized as both the polycondensation reagent and the casting solvent in the fabrication of the highly acid doped-PBI membrane. The acid-doped PBI membranes are very hygroscopic due to the presence of the acid. As such, when the acid-doped PBI membrane is exposed to ambient air, a layer of water forms on the exposed surface of the membrane, thereby making it extremely difficult to bond the PBI membrane to anything, including to another PBI membrane.

Therefore, in order to enable the bonding together of two acid-doped PBI membranes, a material must be utilized which either interacts with the acid-doped PBI membranes to serve as an intermediary to hold the membranes together, or which temporarily disrupts the polymer bonds to allow the membranes to interact with each other. The present invention relates to the latter scenario. More particularly, the present invention disrupts the bonds between two acid-doped PBI membranes and subsequently reconstitutes these bonds.

Referring to FIG. 1, to carry out the bonding method, first and second acid-doped PBI films or membranes 10, 12 are formed. In one embodiment, the polymer of the membranes 10, 12 is poly-2,2"-(m-phenylene)-5,5"-bibenzimidazole (m-PBI) or poly[2,2'-(p-phenylene)-5,5'-bibenzimidazole] (p-PBI). Preferably, each film or membrane 10, 12 is an acid-doped p-PBI film or membrane. In one embodiment, the first and second acid-doped PBI films or membranes 10, 12 are formed by the PPA process. Typically, films or membranes formed by the PPA process do not bond with each other. The present invention, however, provides a method for bonding such films or membranes together.

Next, the first acid-doped PBI membrane 10 is placed on a first substrate 14 to form a first membrane/substrate assembly (or first film/substrate assembly) and the second acid-doped PBI membrane 12 is placed on a second substrate 16 to form a second membrane/substrate assembly (or second film/substrate assembly). Preferably, the first and second substrates 14, 16 are symmetrical to each other. Preferably, the first and second substrates 14, 16 are chemical-resistant substrates. Also, in one embodiment, the first and second substrates 14, 16 are porous substrates. In one embodiment, the first and second porous substrates 14, 16 have pore sizes ranging from 1 nm to 100 cm. The first and second membrane/substrate assemblies are then heated to a predetermined temperature for a predetermined duration in order to effectively soften the polymer of the respective first and second acid-doped PBI membranes. Preferably, the first and second membrane/substrate assemblies are heated to a temperature within 200 degrees of the Tg of PBI.

In one embodiment, each membrane/substrate assembly is heated to a temperature of approximately 300° C. At such a temperature, the phosphoric acid is converted back into PPA to effect the bonding of the two membranes, as discussed in more detail hereinafter.

In another embodiment, each membrane/substrate assembly is heated to a temperature of approximately 200° C. to approximately 250° C., and subsequently a polymer solvent is applied to or coated on one surface of each of the softened first and second acid-doped PBI membranes. More preferably, each membrane/substrate assembly is heated to a temperature of approximately 220° C.

In one embodiment, each membrane/substrate assembly is placed on a hot plate 18 and heated to the predetermined temperature. In one embodiment, the predetermined duration of heating is approximately 5 to 15 minutes, and more preferably approximately 10 minutes of heating. As a result of the heating, the first and second acid-doped PBI membranes 10, 12 become effectively softened.

Subsequently, a coating 20 of a polymer solvent is applied to an exposed surface of each softened first and second acid-doped PBI membrane 10, 12 which is to be bonded to another material or membrane surface. Preferably, the polymer solvent is a polyacid, and more preferably polyphosphoric acid. The surfaces to which the polymer solvent has been applied are then contacted with each other while still being positioned on one of the heated porous substrates. More particularly, the second membrane/substrate assembly is positioned atop the first membrane/substrate assembly, such that the first acid-doped PBI film (and more particularly the surface of the first membrane 10 to which the polyphosphoric acid has been applied) is in contact with the second acid-doped PBI film (and more particularly the surface of the second membrane 12 to which the polyphosphoric acid has been applied). Preferably, pressure is applied to the first and second membrane/substrate assemblies when they are positioned atop one another (e.g., by a weight 22 placed atop the second membrane/substrate assembly), in order to ensure full contact of the first and second acid-doped PBI membranes 10, 12, for example, as in a clamped or clasped assembly. In one embodiment, approximately 0.01 to 10 psi of pressure is applied to the assemblies. It will be understood by those skilled in the art that any known method for applying pressure to two membranes or films in contact with each other may be suitable for use in the present invention.

The polymer solvent (or the converted PPA) disrupts the PBI polymer chains of the first and second acid-doped PBI membranes 10, 12, thereby allowing the first and second acid-doped PBI membranes 10, 12 to interact with each other, and more particularly allowing the PBI polymer chains of the first and second acid-doped PBI membranes 10, 12 to interact with each other. During this time, the first and second membrane/substrate assemblies are still being heated. Heat is applied for a sufficient duration, for example approximately 5 minutes, to allow the PBI polymer chains of the first and second acid-doped PBI membranes 10, 12 to interact with each other. After allowing sufficient time for the PBI polymer chain interactions, the heat source is removed from the first and second membrane/substrate assemblies and the first and second membrane/substrate assemblies are re-hydrolyzed. More particularly, the first and second acid-doped PBI membranes 10, 12 of each assembly are re-hydrolyzed. For example, each of the first and second membrane/substrate assemblies may be placed in either an acid bath or a deionized water bath 24 in order to allow them to re-hydrolyze, and more particularly to allow the first and second acid-doped PBI membranes 10, 12 to re-hydrolyze. The acid bath or deionized water bath 24 is preferably maintained at a temperature in the range from room temperature to a temperature below the boiling point of the acid or deionized water. The PBI polymer chains of both the first and second acid-doped PBI membranes 10, 12 are therefore reformed and interlocked with each other, which effectively bonds together the first and second acid-doped PBI membranes 10, 12 in a PBI bonded membrane structure 26. Further, the porous substrates 14, 16 allow the first and second acid-doped PBI membranes to be re-hydrolyzed in a permanently-bonded and aesthetically pleasing structure.

Figure 2:
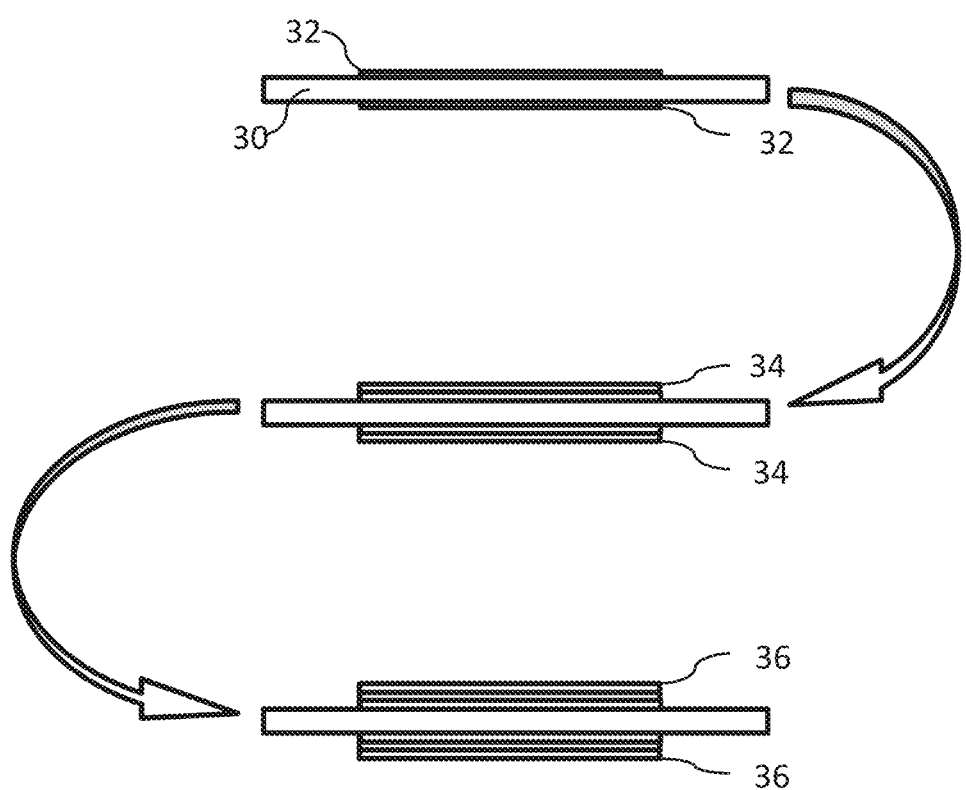
FIG. 2 is a schematic diagram of a method in accordance with another embodiment of the present invention.

Referring to FIG. 2, in another embodiment, the invention relates to a process for bonding a p-PBI membrane or film to a metal substrate using a multiple material intermediary layer. First, a polymer solvent, such as polyamic acid, is cast directly onto the metal substrate 30. The metal substrate 30 may be porous or non-porous. The polyamic acid coating is then partially cured, for example using a specified thermal ramp program, in a manner that results in the formation of a polyimide (PI) membrane 32 bonded to the metal substrate 30. A layer of m-PBI 34 is then cast onto the partially-cured PI surface 32 and the structure is then subjected through the same specified thermal ramp program, which results in a permanent bond between the m-PBI 34 and PI 32 surfaces. A pre-heated p-PBI solution 36 is then cast onto the m-PBI layer 34 which is bonded to the PI 32 surface and, directly afterwards, the cast pre-heated p-PBI solution 36 is hydrolyzed using either deionized water or phosphoric acid, which results in a permanent bond at the interface between the p-PBI and m-PBI surfaces 36, 34. Other p-PBI membranes can subsequently be bonded to this structure using the aforementioned procedure for bonding together acid-doped p-PBI membranes.

A direct heat to electricity engine includes solid state electrodes of an electrochemically active material that has an electrochemical reaction potential that is temperature dependent. The electrodes are configured in combination with electrolyte separators to form membrane electrode assemblies. The membrane electrode assemblies are grouped into pairs, whereby each membrane electrode assembly of a given pair is ionically and electronically interconnected with the other. The above-described method may be used to connect the hydrogen membranes of such membrane electrode assemblies.

It will be appreciated by those skilled in the art that changes could be made to the embodiments described above without departing from the broad inventive concept thereof. All such changes, combinations, and variations are included herein by the scope of this disclosure and the appended claims. It is to be understood, therefore, that the present invention is not limited to the particular embodiments disclosed, but it is intended to cover modifications within the spirit and scope of the appended claims.

We claim:

1. A method for bonding together two or more acid-doped polybenzimidazole films, the method comprising, in the following order:
   placing a first acid-doped polybenzimidazole film on a first substrate to form a first film/substrate assembly and placing a second acid-doped polybenzimidazole film on a second substrate to form a second film/substrate assembly;
   heating the first and second film/substrate assemblies to a temperature sufficient to soften the first and second acid-doped polybenzimidazole films;
   positioning the second film/substrate assembly atop the first film/substrate assembly, such that the first acid-doped polybenzimidazole film is in contact with the second acid-doped polybenzimidazole film and such that the polybenzimidazole polymer chains of the first acid-doped polybenzimidazole film interact with polybenzimidazole polymer chains of the second acid-doped polybenzimidazole film; and
   re-hydrolyzing the first and second acid-doped polybenzimidazole films, such that the polybenzimidazole polymer chains of the first and second acid-doped polybenzimidazole films are therefore reformed and interlocked with each other to bond together the first and second acid-doped polybenzimidazole films.

2. The method of claim 1, wherein each of the first and second acid-doped polybenzimidazole films is an acid-doped polybenzimidazole membrane.

3. The method of claim 2, wherein each acid-doped polybenzimidazole membrane has been fabricated by a sol-gel process.

4. The method of claim 1, wherein the sol-gel process utilizes polyphosphoric acid.

5. The method of claim 4, wherein each of the first and second acid-doped polybenzimidazole films is made of poly[2,2'-(p-phenylene)-5,5'-bibenzimidazole] (p-PBI).

6. The method of claim 1, where each of the first and second porous substrates has pore sizes ranging from 1 nm to 100 cm.

7. The method of claim 1, wherein the first and second film/substrate assemblies are heated to a temperature of approximately 300° C.

8. The method of claim 1, further comprising applying a coating of a polymer solvent to an exposed surface of each of the first and second acid-doped polybenzimidazole films after heating of the first and second film/substrate assemblies and prior to positioning the second film/substrate assembly atop the first film/substrate assembly.

9. The method of claim 8, wherein the polymer solvent is polyphosphoric acid.

10. The method of claim 8, wherein the first and second film/substrate assemblies are heated to a temperature of approximately 220° C.

11. The method of claim 1, further comprising applying pressure to the first and second film/substrate assemblies when the second film/substrate assembly is positioned atop the first film/substrate assembly.

12. The method of claim 11, wherein approximately 0.1 to 10 psi of pressure is applied to the first and second film/substrate assemblies.

13. The method of claim 1, wherein re-hydrolyzing the first and second acid-doped polybenzimidazole films involves placing the first and second acid-doped polybenzimidazole films in an acid bath.

14. The method of claim 1, wherein re-hydrolyzing the first and second acid-doped polybenzimidazole films involves placing the first and second acid-doped polybenzimidazole films in a deionized water bath.

15. The method of claim 1, wherein the first and second substrates are porous substrates.

* * * * *